March 13, 1956  C. J. SIMMONS  2,738,220
ARMREST FOR ATTACHMENT TO AUTOMOBILE WINDOW SILLS
Filed March 13, 1952
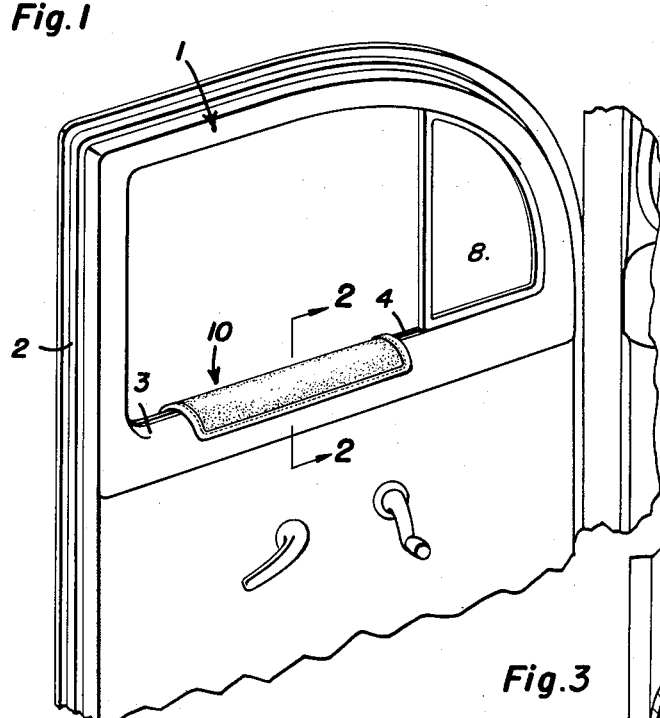
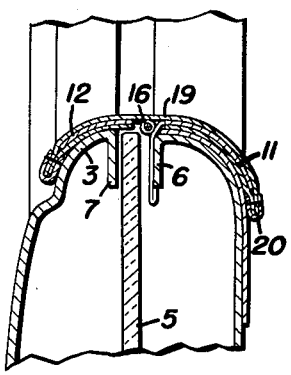
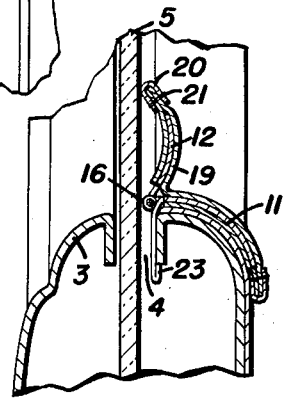
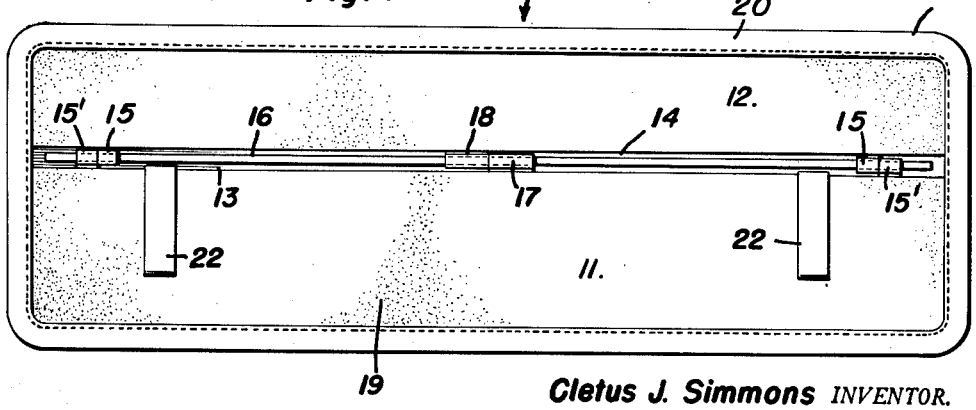
Cletus J. Simmons INVENTOR.

United States Patent Office 2,738,220
Patented Mar. 13, 1956

2,738,220

ARMREST FOR ATTACHMENT TO AUTOMOBILE WINDOW SILLS

Cletus J. Simmons, Rock Island, Ill.

Application March 13, 1952, Serial No. 276,324

1 Claim. (Cl. 296—49.2)

My invention relates to improvements in arm rests for attachment to automobile window sills to support the driver's arm.

Many drivers of automobiles rest the left arm during driving on the window sill formed by the bottom of the window frame for comfort in driving. The window sill frequently becomes hot, after the automobile has been left standing in the sun, so as to burn an arm rested thereon, and the practice of so resting an arm frequently results in damage to the finish of the sill by perspiration and grease on the arm.

With the foregoing in mind, the primary object of my invention is to provide a practical arm rest which is attachable to the window sill quickly and easily to remain attached when the window is opened or closed and which is constructed to bridge the sill when the window is open and conformably rest the arm while protecting the finish of the sill part of the window frame against damage from perspiration, or from becoming scratched from sleeve buttons, or the like.

Another object is to provide an arm rest for the above purposes formed of light weight material and which is inexpensive to manufacture so as to reduce the cost of such rests, and which is padded for comfort and attachable in the usual window glass slot so that no extra attaching means on the sill is required.

Other and subordinate objects, within the purview of my invention, together with the precise nature of my improvements will be readily understood when the succeeding description and claim are read with reference to the accompanying drawing forming a part of this specification.

In said drawing:

Figure 1 is a fragmentary view in perspective illustrating my improved arm rest in the preferred embodiment thereof attached to the sill of a front window of an automobile;

Figure 2 is an enlarged view in transverse section taken on the line 2—2 of Figure 1;

Figure 3 is a similar view illustrating the rest folded to permit the raising of the window glass for closing the window, and Figure 4 is a further enlarged view in bottom plan.

Referring now in detail and by reference numerals to the embodiment of my invention illustrated in the drawing, 1 designates the usual window frame of the automobile door 2, the bottom of said frame forming a transversely convex sill 3 with the usual longitudinal slot 4 therein through which the window glass 5 is raised and lowered to open and close the window with the glass interposed between depending longitudinal inner and outer flanges 6, 7 on said sill at opposite sides of the slot 4. The numeral 8 designates the conventional front ventilation glass section of the window.

The arm rest of my invention comprises an oblong, rectangular saddle 10 of a length to extend longitudinally along the sill 1 a distance sufficient for the support of an arm on said saddle. The saddle 10 comprises a pair of longitudinally extending, inboard and outboard body sections 11, 12 of suitable rigid material, such as plastic, hingedly connected together in spaced apart relation at inner longitudinal edges 13, 14 thereof by a pair of hinge barrels 15 on the inner edge 14 of the outboard section 12, adjacent the ends of the section, fitting between a pair of hinged barrels 15' on the inner edge 13 of the inboard section 11 to prevent relative displacement of said sections longitudinally, a pintle rod 16 extending through said barrels 15, 15' between said sections 11, 12 and central side-by-side edge hinge barrels 17, 18 on the inner edges 13, 14 of said sections 11, 12 through which said rod 16 extends.

The body sections 11, 12 are padded by a layer of soft, durable covering material 19, preferably of fabric, and covering both sections 11, 12 on top thereof so as to conceal the hinge barrels 15, 15', 17 and 18 and the pintle rod 16, and which is folded along the outer longitudinal edges of said sections 11, 12 and covers the bottom of said sections to the inner edges 13, 14 of the same. The covering material 19 is adhesively secured to said sections 11, 12 by any suitable adhesive, not shown.

A protective binder strip 20 of harder material extends around the body sections 11, 12 and is stitched to the covering material 9, as at 21.

The sections 11, 12 are curved in cross-section to fit on the sill 3, the inboard section 11 fitting on said sill on the inboard side of the glass 5, and the outboard section 12 fitting on said sill on the outboard side of glass.

A pair of attaching fingers 22 depend from the inner edge 13 of the inboard section 11 adjacent the ends of the latter for insertion downwardly in the slot 4 and are provided with bent over terminals 23 designed to fit under the inner flange 6 with said fingers 22 fitting flat against said flange, as shown in Figure 3. With the fingers 22 thus attached, the hinge barrels 15', 15, 17, 18 and the pintle rod 16 are spaced over the slot 4 inwardly of the glass 5 so that the outboard section 12 may be swung upwardly, as shown in Figure 3, to permit the glass 5 to be raised and lowered above the sill 3.

The use and operation of my invention will be readily understood. The saddle 10 is placed on the sill 3 and attached to the flange 6 in a manner described, with the outboard section 12 swung flat against the sill 3, when the glass 5 is fully lowered. When it is desired to raise the glass 5, the outboard section may be swung upwardly and inwardly to permit the glass to be raised and lowered and will rest against said glass when the same is raised out of the slot 4. The layer covering material 19 protects the sill 3 against being scratched by the arm rest, or by an arm disposed on said arm rest and provides a soft comfortable surface for supporting the arm of the driver.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

An arm rest for attachment to an automobile window sill having a longitudinal slot therein for raising and lowering a window glass through said slot, said rest comprising an elongated saddle adapted to extend along and upon said sill in straddling relation thereto and including a pair of elongated rigid body sections having inner opposite longitudinal edges, a pair of hinge barrels on each of said inner edges adjacent the ends of the sections, one pair fitting between the other pair to prevent relative longitudinal movement of said sections and spacing said inner edges apart, a pintle rod extending through said hinge barrels and accommodated in the space between said edges, one of said sections being swingable upwardly on said rod to permit the window glass to be raised, a pair of attaching fingers on the inner edges of the other section extending through said space at one side of the pintle rod and having ends engageable with an edge of the slot to hold said other section in place, and a flexible covering on said sections bridging said space and covering said hinge barrels, pintle rod, and fingers to conceal the same from view.

References Cited in the file of this patent

UNITED STATES PATENTS

| | | |
|---|---|---|
| 2,274,026 | Allen | Feb. 24, 1942 |
| 2,418,092 | Passel | Mar. 25, 1947 |
| 2,536,895 | West | Jan. 2, 1951 |
| 2,568,811 | Larsen | Sept. 25, 1951 |
| 2,569,436 | Allen, Sr. | Oct. 2, 1951 |
| 2,600,296 | Jacobs | June 10, 1952 |
| 2,601,052 | Ortleb | June 17, 1952 |
| 2,670,235 | Susil | Feb. 23, 1954 |
| 2,690,350 | Shapiro | Sept. 28, 1954 |